(12) United States Patent
Kawano et al.

(10) Patent No.: US 11,848,611 B2
(45) Date of Patent: *Dec. 19, 2023

(54) SWITCHING POWER SUPPLY DEVICE

(71) Applicant: ROHM CO., LTD, Kyoto (JP)

(72) Inventors: Akihiro Kawano, Kyoto (JP); Yuhei Yamaguchi, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/805,110

(22) Filed: Jun. 2, 2022

(65) Prior Publication Data

US 2022/0294349 A1    Sep. 15, 2022

Related U.S. Application Data

(63) Continuation of application No. 17/071,041, filed on Oct. 15, 2020, now Pat. No. 11,381,168.

(30) Foreign Application Priority Data

Oct. 18, 2019    (JP) ................................. 2019-191476

(51) Int. Cl.
*H02M 3/158*    (2006.01)
*H02M 3/07*    (2006.01)
*H02M 1/00*    (2006.01)

(52) U.S. Cl.
CPC ......... *H02M 3/158* (2013.01); *H02M 1/0095* (2021.05); *H02M 3/07* (2013.01); *H02M 1/009* (2021.05); *H02M 3/072* (2021.05)

(58) Field of Classification Search
CPC ........ H02M 3/156; H02M 3/158; H02M 3/07; H02M 3/072; H02M 3/073; H02M 1/009; H02M 1/0095; H02M 1/0003
See application file for complete search history.

(56) References Cited

U.S. PATENT DOCUMENTS

| 7,696,735 | B2 |  | 4/2010 | Draw et al. | |
|---|---|---|---|---|---|
| 10,547,241 | B1 | * | 1/2020 | Li | .......... H02M 3/1588 |
| 10,651,736 | B1 |  | 5/2020 | Azaro et al. | |
| 11,258,359 | B2 | * | 2/2022 | Baek | ........... H02M 3/07 |
| 2009/0033289 | A1 | * | 2/2009 | Xing | ........... H02M 3/1588 |
|  |  |  |  |  | 320/140 |
| 2014/0103897 | A1 | * | 4/2014 | Wang | ........... H03K 17/164 |
|  |  |  |  |  | 323/311 |
| 2014/0266135 | A1 |  | 9/2014 | Zhak et al. | |
| 2017/0331374 | A1 | * | 11/2017 | Høyerby | ............ H03F 3/183 |

(Continued)

*Primary Examiner* — Thienvu V Tran
*Assistant Examiner* — Shahzeb K Ahmad
(74) *Attorney, Agent, or Firm* — CHIP LAW GROUP

(57) ABSTRACT

A switching power supply device includes first to fourth switches sequentially connected in series, an inductor, a first capacitor whose first end is connected to a connection node of the first switch and the second switch and whose second end is connected to a connection node of the third switch, the fourth switch, and the inductor, a second capacitor whose first end is connected to a connection node of the second switch and the third switch, and a controller that controls switching on and off of the first to fourth switches. In at least one of a first pair configured with the first switch and the third switch and a second pair configured with the second switch and the fourth switch, the controller shifts a timing of switching from off to on between two switches.

8 Claims, 7 Drawing Sheets

(56) References Cited

U.S. PATENT DOCUMENTS

| | | | |
|---|---|---|---|
| 2019/0207519 A1* | 7/2019 | Chakraborty | H02M 1/36 |
| 2020/0212795 A1* | 7/2020 | Das | H02M 3/158 |
| 2020/0343816 A1 | 10/2020 | Wu et al. | |
| 2022/0085716 A1* | 3/2022 | Lee | H02M 1/0095 |

* cited by examiner

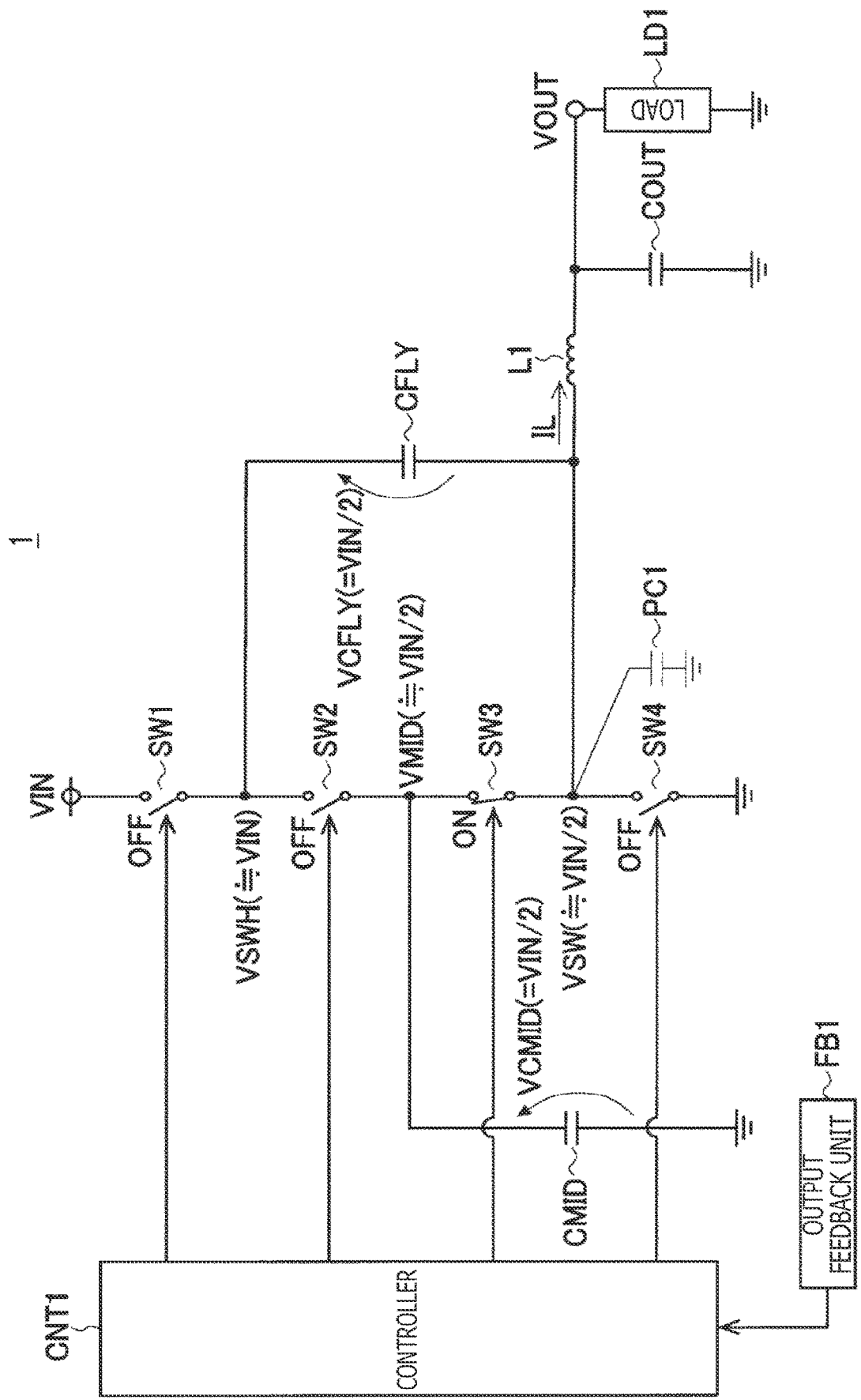

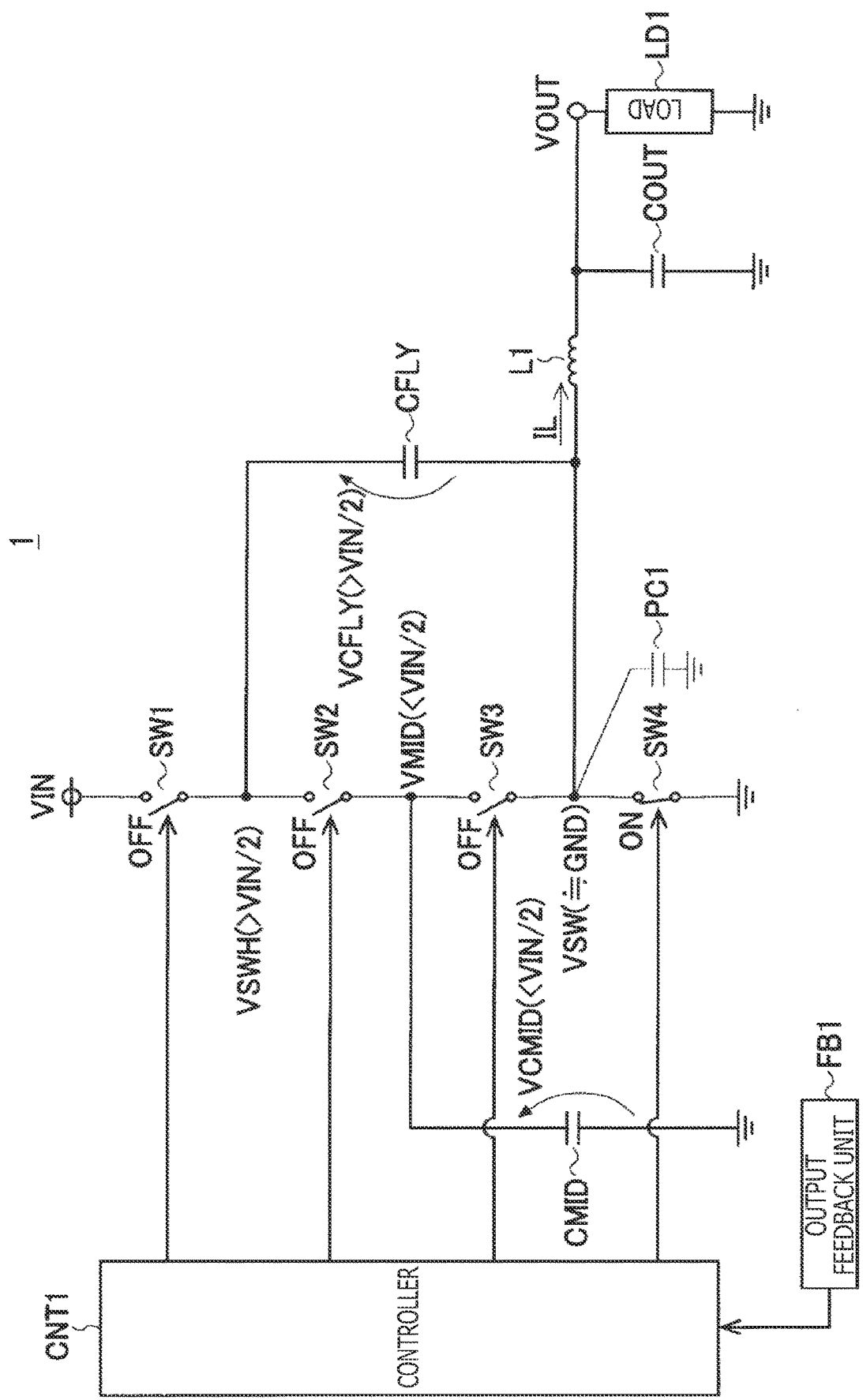

X

SWITCHING POWER SUPPLY DEVICE

CROSS REFERENCE TO RELATED APPLICATIONS

The present application is a continuation application of U.S. patent application Ser. No. 17/071,041, filed on Oct. 15, 2020, which claims priority benefit of Japanese Patent Application No. JP 2019-191476 filed in the Japan Patent Office on Oct. 18, 2019. Each of the above-referenced applications is hereby incorporated herein by reference in its entirety.

BACKGROUND

The present disclosure relates to a switching power supply device that steps down an input voltage to an output voltage.

In recent years, development of a switching power supply device having a configuration in which a switched capacitor and a direct current/direct current (DC/DC) converter including an inductor are combined with each other has vigorously been conducted (e.g., refer to U.S. Pat. No. 7,696,735 (FIG. 4)). Since the switching power supply device having this configuration can suppress a voltage applied to a switch to be low, a switching loss can be reduced, and efficiency can be enhanced.

SUMMARY

However, in a switching power supply device disclosed in U.S. Pat. No. 7,696,735, noise that is likely to affect the outside of the switching power supply device is generated. This is because two switches configuring a first pair are simultaneously switched from off to on at a first timing and two other switches configuring a second pair are simultaneously switched from off to on at a second timing.

In view of the above situation, it is desirable to suppress generation of noise that is likely to affect the outside of a switching power supply device.

A switching power supply device disclosed in the present specification is a switching power supply device that steps down an input voltage to an output voltage, and employs a configuration (first configuration) in which the switching power supply device includes a first switch whose first end is allowed to be connected to an applying end of the input voltage, a first capacitor, a second switch whose first end is allowed to be connected to a second end of the first switch and a first end of the first capacitor, a second capacitor, a third switch whose first end is allowed to be connected to a second end of the second switch and a first end of the second capacitor, an inductor, a fourth switch whose first end is allowed to be connected to a second end of the third switch, a second end of the first capacitor, and a first end of the inductor, and a controller that controls switching on and off of the first switch, the second switch, the third switch, and the fourth switch. In at least one of a first pair configured with the first switch and the third switch and a second pair configured with the second switch and the fourth switch, the controller shifts a timing of switching from off to on between two switches. In a case where a timing of switching from off to on is shifted between the first switch and the third switch in the first pair, the third switch is switched from off to on, and then, the first switch is switched from off to on while the third switch is kept turned on. In a case where a timing of switching from off to on is shifted between the second switch and the fourth switch in the second pair, the fourth switch is switched from off to on, and then, the second switch is switched from off to on while the fourth switch is kept turned on.

In the switching power supply device having the first configuration, a configuration (second configuration) may be employed in which the controller shifts the timing of switching from off to on between the first switch and the third switch in the first pair and generates a first switch control signal for controlling the first switch and a third switch control signal for controlling the third switch; and a slew rate of the first switch control signal at a timing of switching the first switch from off to on is smaller than a slew rate of the third switch control signal at a timing of switching the third switch from off to on.

In the switching power supply device having the first or second configuration, a configuration (third configuration) may be employed in which the controller shifts the timing of switching from off to on between the second switch and the fourth switch in the second pair and generates a second switch control signal for controlling the second switch and a fourth switch control signal for controlling the fourth switch; and a slew rate of the second switch control signal at a timing of switching the second switch from off to on is smaller than a slew rate of the fourth switch control signal at a timing of switching the fourth switch from off to on.

A switch control device disclosed in the present specification is a switch control device that controls switching on and off of a first switch whose first end is allowed to be connected to an applying end of an input voltage, switching on and off of a second switch whose first end is allowed to be connected to a second end of the first switch and a first end of a first capacitor, switching on and off of a third switch whose first end is allowed to be connected to a second end of the second switch and a first end of a second capacitor, and switching on and off of a fourth switch whose first end is allowed to be connected to a second end of the third switch, a second end of the first capacitor, and a first end of an inductor. The switching control device has a configuration (fourth configuration) in which, in at least one of a first pair configured with the first switch and the third switch and a second pair configured with the second switch and the fourth switch, a timing of switching from off to on is shifted between two switches. In a case where a timing of switching from off to on is shifted between the first switch and the third switch in the first pair, the third switch is switched from off to on, and then, the first switch is switched from off to on while the third switch is kept turned on. In a case where a timing of switching from off to on is shifted between the second switch and the fourth switch in the second pair, the fourth switch is switched from off to on, and then, the second switch is switched from off to on while the fourth switch is kept turned on.

An in-vehicle device disclosed in the present specification has a configuration (fifth configuration) including the switching power supply device of any one of the first to third configurations or the switch control device of the fourth configuration.

A vehicle disclosed in the present specification has a configuration (sixth configuration) including the in-vehicle device of the fifth configuration and a battery that supplies power to the in-vehicle device.

The present disclosure can suppress generation of noise that is likely to affect the outside of a switching power supply device.

BRIEF DESCRIPTION OF THE DRAWINGS

FIG. 1B is a diagram illustrating a state of the switching power supply device immediately before a third timing;

FIG. 1C is a diagram illustrating the state of the switching power supply device immediately before a sixth timing;

DETAILED DESCRIPTION OF THE PREFERRED EMBODIMENT

1. Configuration Example of Switching Power Supply Device

Figure 1A:
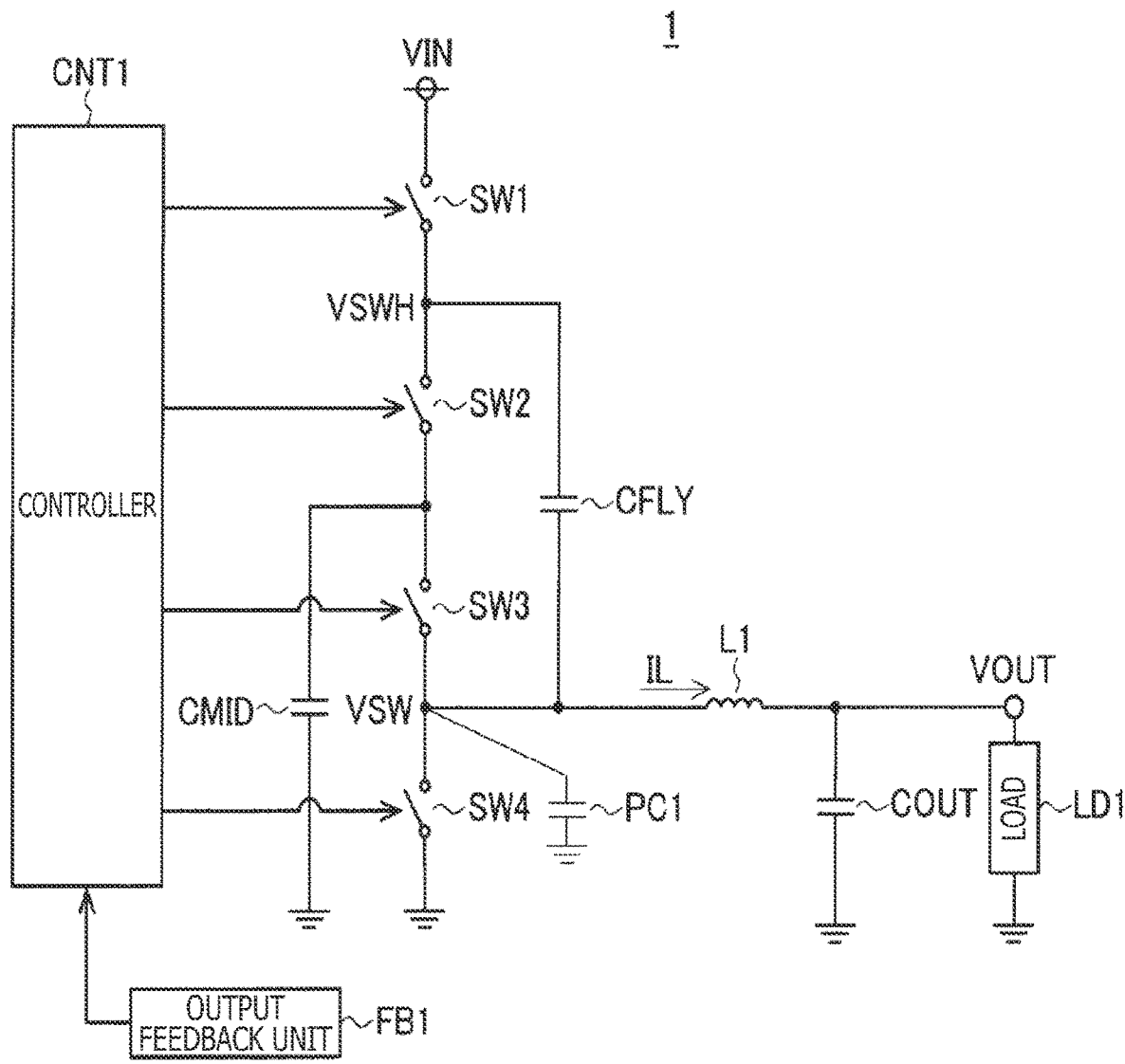
FIG. 1A is a diagram illustrating a configuration example of a switching power supply device.

FIG. 1A is a diagram illustrating a configuration example of a switching power supply device. A switching power supply device 1 illustrated in FIG. 1A is a switching power supply device that steps down an input voltage VIN to an output voltage VOUT, and includes a controller CNT1, first to fourth switches SW1 to SW4, a first capacitor CFLY, a second capacitor CMID, an inductor L1, an output capacitor COUT, and an output feedback unit FB1.

The controller CNT1 controls switching on and off of the first to fourth switches SW1 to SW4, based on an output of the output feedback unit FB1. In other words, the controller CNT1 is a switch control device that controls switching on and off of the first to fourth switches SW1 to SW4.

A first end of the first switch SW1 is connected to an applying end of the input voltage VIN. A second end of the first switch SW1 is connected to a first end of the second switch SW2 and a first end of the first capacitor CFLY. As the first switch SW1, for example, a P-channel type metal oxide semiconductor (MOS) transistor or an N-channel type MOS transistor can be used. For example, in a case where the N-channel type MOS transistor is used as the first switch SW1, in order to generate a voltage higher than the input voltage VIN, the switching power supply device 1 may be provided with, for example, a bootstrap circuit.

A second end of the second switch SW2 is connected to a first end of the third switch SW3 and a first end of the second capacitor CMID. As the second switch SW2, for example, the P-channel type MOS transistor or the N-channel type MOS transistor can be used. For example, in a case where the N-channel type MOS transistor is used as the second switch SW2, in order to generate a voltage higher than a voltage VSWH at a connection node of the first switch SW1 and the second switch SW2, the switching power supply device 1 may be provided with, for example, the bootstrap circuit.

A second end of the third switch SW3 is connected to a first end of the fourth switch SW4, a second end of the first capacitor CFLY, and a first end of the inductor L1. As the third switch SW3, for example, the P-channel type MOS transistor or the N-channel type MOS transistor can be used. For example, in a case where the N-channel type MOS transistor is used as the third switch SW3, in order to generate a voltage higher than a voltage at a connection node of the second switch SW2 and the third switch SW3, the switching power supply device 1 may be provided with, for example, the bootstrap circuit.

A second end of the fourth switch SW4 is connected to ground potential. As the fourth switch SW4, the P-channel type MOS transistor or the N-channel type MOS transistor can be used, for example. Note that, unlike the present exemplary embodiment, the second end of the fourth switch SW4 may be connected to an applying end of a voltage that is lower than the input voltage VIN and is other than the ground potential.

The second end of the second capacitor CMID is connected to the ground potential. Note that, unlike the present exemplary embodiment, the second end of the second capacitor CMID may be connected to the applying end of the voltage that is lower than the input voltage VIN and is other than the ground potential. For example, the second end of the second capacitor CMID may be connected to a connection node of the inductor L1 and the output capacitor COUT.

A second end of the inductor L1 is connected to a first end of the output capacitor COUT and an applying end of the output voltage VOUT. The applying end of the output voltage VOUT is connected with the load LD1.

A second end of the output capacitor COUT is connected to the ground potential. Note that, when ripples in the output voltage VOUT satisfy requirement specifications even without the output capacitor COUT, a configuration provided with no output capacitor COUT may be used.

The output feedback unit FB1 generates and outputs a feedback signal according to the output voltage VOUT. As the output feedback unit FB1, for example, a resistance voltage-dividing circuit that resistance-divides the output voltage VOUT and generates the feedback signal may be used. Further, for example, the output feedback unit FB1 may be configured to obtain the output voltage VOUT and output the output voltage VOUT itself as the feedback signal. Note that the output feedback unit FB1 may be configured to also generate and output a feedback signal according to a current flowing through the inductor L1 (hereinafter, referred to as an "inductor current IL"), in addition to the feedback signal according to the output voltage VOUT. When the output feedback unit FB1 also generates the feedback signal according to the inductor current IL, current mode control can be performed.

2. Operation of Switching Power Supply Device

Figure 2:
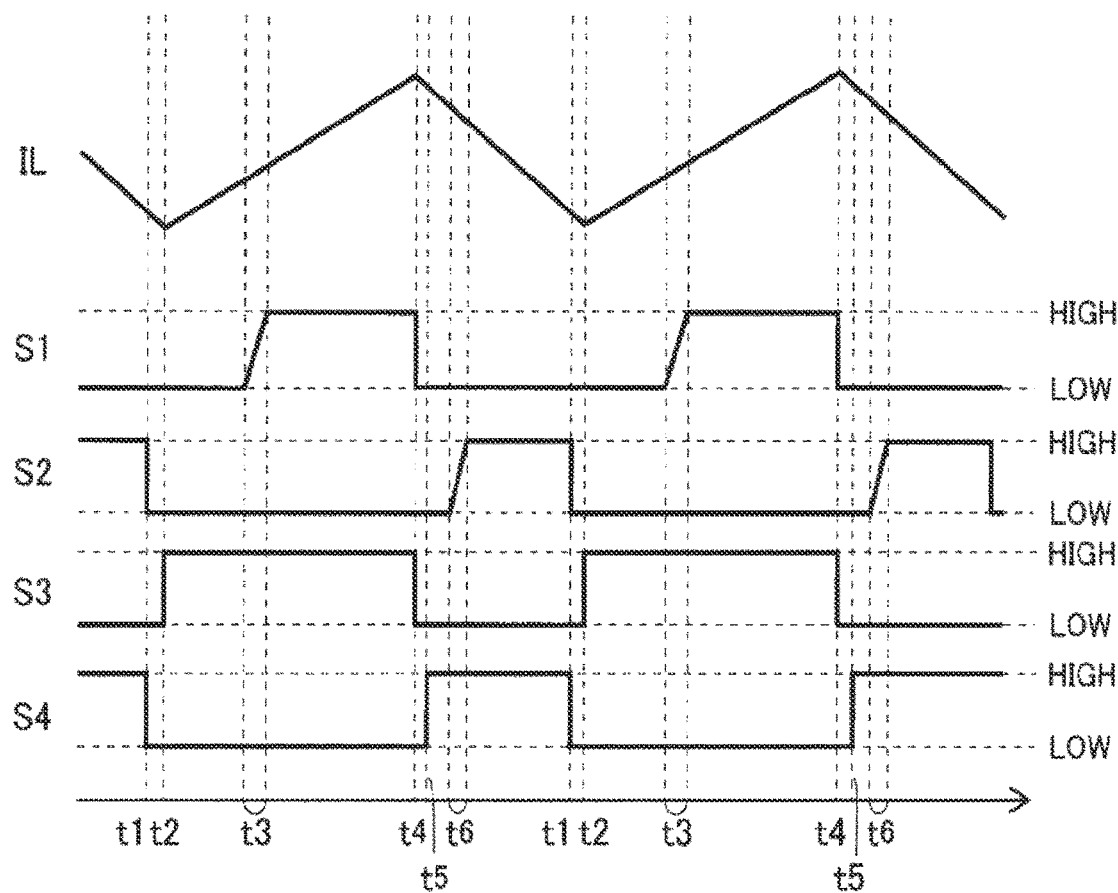
FIG. 2 is a timing chart illustrating an operation of a switching power supply device according to an exemplary embodiment.
Figure 3:
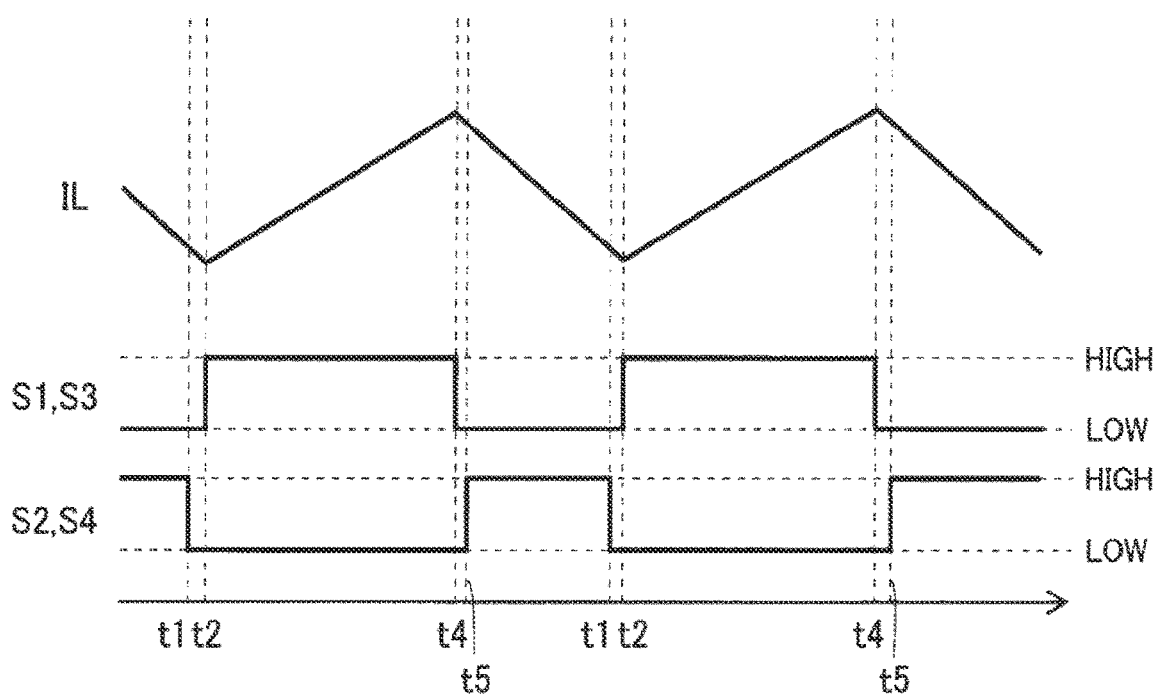
FIG. 3 is a timing chart illustrating an operation of a switching power supply device according to a reference example.

FIG. 2 is a timing chart illustrating an operation of the switching power supply device 1, that is, an operation of the switching power supply device according to the exemplary embodiment. FIG. 3 is a timing chart illustrating an operation of the switching power supply device 1 in a case where the controller CNT1 performs control similar to that of U.S. Pat. No. 7,696,735, that is, an operation of a switching power supply device according to a reference example.

In FIGS. 2 and 3, Sk is a k-th switch control signal for controlling a k-th switch SWk. Note that k is an integer of one to four. Each of FIGS. 2 and 3 illustrates a waveform of the k-th switch control signal Sk in a case where the first to fourth switches SW1 to SW4 are the NMOS transistors.

Figure 4:
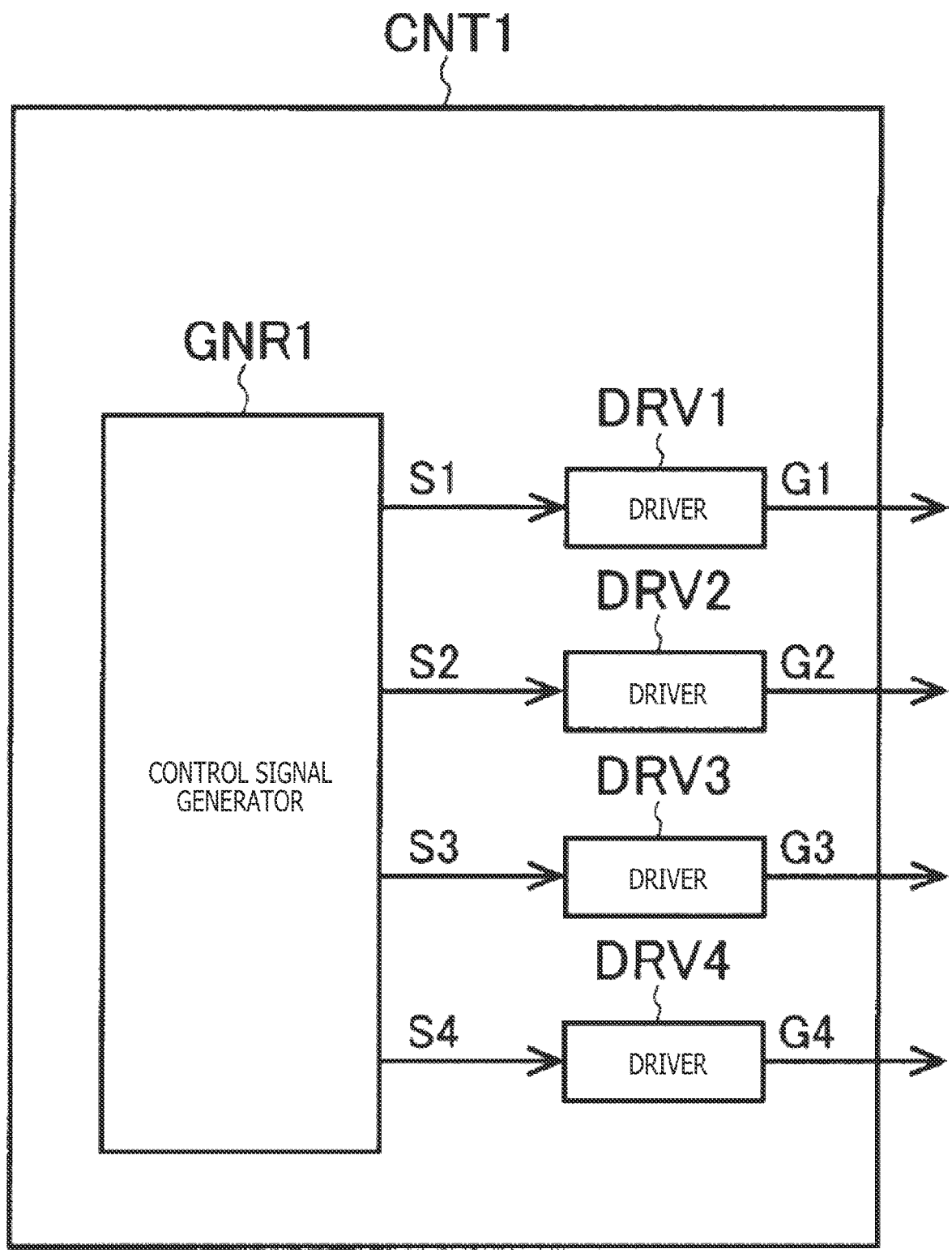
FIG. 4 is a diagram illustrating a schematic configuration example of a controller.

The controller CNT1 generates the k-th switch control signal Sk based on an output of the output feedback unit FB1. The controller CNT1 also generates a k-th switch drive signal Gk configured so as to enhance a current capability of the k-th switch control signal Sk. The controller CNT1 includes a control signal generator GNR1 and a driver DRVk as illustrated in FIG. 4, for example. The driver DRVk generates the k-th switch drive signal Gk based on the k-th switch control signal Sk. Note that the k-th switch drive signal Gk turns to a high level when the k-th switch control signal Sk is a high level, and turns to a low level when the k-th switch control signal Sk is a low level. The k-th switch drive signal Gk is supplied to a control end of the k-th switch SWk (a gate of the NMOS transistor when the k-th switch SWk is the NMOS transistor).

2-1. Control of First and Third Switches

2-1-1. Exemplary Embodiment

As illustrated in FIG. 2, in the exemplary embodiment, after a first timing t1 at which the second switch SW2 and the fourth switch SW4 are switched from on to off, the controller CNT1 first switches the third switch SW3 from off to on at a second timing t2. A period from the first timing t1 to the second timing t2 is what is generally called a dead time period.

When the third switch SW3 is turned on, a current flows from the second capacitor CMID to the third switch SW3. This charges parasitic capacitance PC1 connected to a connection node of the third switch SW3 and the fourth switch SW4 (parasitic capacitance mainly formed between both ends of the fourth switch), and a voltage VSW at the connection node of the third switch SW3 and the fourth switch SW4 increases. Since a charged amount of the first capacitor CFLY is not changed, a voltage VSWH also increases as the voltage VSW increases. The voltage VSWH increases until the voltage VSWH turns to be substantially the same as the input voltage VIN.

During a short period of time after the timing t2, a spike current flows through the third switch SW3. However, due to a circuit operation, although a withstand voltage of the first switch SW1 is to be more than the input voltage VIN, a withstand voltage of the third switch SW3 is only required to be equal to or more than a half of the input voltage VIN. Accordingly, in the exemplary embodiment, on-resistance of the third switch SW3 is easily reduced, and a switching loss of the third switch SW3 can easily be reduced.

The above-described spike current flows from the second capacitor CMID to the third switch SW3 and acts as a charging current of the parasitic capacitance PC1. Since the first switch SW1 is turned off until a third timing t3 to be described later arrives, the above-described spike current does not affect a power supply line to which the input voltage VIN is applied. Accordingly, the exemplary embodiment can suppress propagation of noise through the power supply line to which the input voltage VIN is applied. In other words, the exemplary embodiment can suppress generation of noise that is likely to affect the outside of the switching power supply line.

After the voltage VSWH increases until the voltage VSWH turns to be substantially the same as the input voltage VIN, the controller CNT1 switches the first switch SW1 from off to on at the third timing t3. Immediately before the third timing t3, as illustrated in FIG. 1B, the third switch SW3 is turned on, and the first switch SW1, the second switch SW2, and the fourth switch SW4 are turned off. Further, immediately before the third timing t3, as illustrated in FIG. 1B, each of a both-end potential difference VCFLY of the first capacitor CFLY and a both-end potential difference VCMID of the second capacitor CMID is substantially a half of the input voltage VIN (VIN/2). Thus, each of the voltage VMID at the connection node of the second switch SW2 and the third switch SW3 and the voltage VSW at the connection node of the third switch SW3 and the fourth switch SW4 turns to be substantially the same as the half of the input voltage VIN (VIN/2). Further, immediately before the third timing t3, as illustrated in FIG. 1B, a voltage VSWH at a connection node of the first switch SW1 and the second switch SW2 is substantially the same as the input voltage VIN. Accordingly, a both-end potential difference of the first switch SW1 at the third timing t3 is substantially zero. As a result, a switching loss of the first switch SW1 at the third timing t3 is substantially zero.

The controller CNT1 then switches the first switch SW1 and the third switch SW3 from on to off at a fourth timing t4.

The inductor current IL flows only through the third switch SW3 during a period from the second timing t2 to the third timing t3, and flows through the first switch SW1 and the third switch SW3 while being distributed during a period from the third timing t3 to the fourth timing t4. During a period from the second timing t2 to the fourth timing t4, the inductor current IL increases.

In the present exemplary embodiment, a slew rate of the first switch control signal S1 at the third timing t3 is set smaller than a slew rate of the third switch control signal S3 at the second timing t2. This can avoid the current flowing through the first switch SW1 at the third timing t3 from increasing rapidly, and thus, switching noise of the first switch SW1 can be suppressed. In this manner, even when the first switch SW1 is slowly switched from off to on, the switching loss of the first switch SW1 at the third timing t3 is substantially zero as described above, whereby efficiency is not deteriorated.

2-1-2. Reference Example

As illustrated in FIG. 3, in a reference example, after the first timing t1 at which the second switch SW2 and the fourth switch SW4 are switched from on to off, the controller CNT1 switches the first switch SW1 and the third switch SW3 from off to on at the second timing t2.

When the first switch SW1 and the third switch SW3 are turned on, a current flows from the first switch SW1 to the first capacitor CFLY, and a current flows from the second capacitor CMID to the third switch SW3. With this configuration, the parasitic capacitance PC1 is charged, and the voltage VSW at the connection node of the first switch SW1 and the second switch SW2 increases.

During a short period of time after the second timing t2, a spike current flows through both the first switch SW1 and the third switch SW3.

Further, the first end of the first switch SW1 is connected to the applying end of the input voltage VIN, and thus, the spike current flowing through the first switch SW1 affects the power supply line to which the input voltage VIN is applied. Accordingly, the reference example finds it difficult to suppress propagation of the noise through the power supply line to which the input voltage VIN is applied. In other words, the reference example finds it difficult to suppress generation of the noise that is likely to affect the outside of the switching power supply device.

Further, in the reference example, the first switch SW1 is switched from off to on in a state in which the both-end potential difference of the first switch SW1 is not substantially zero, whereby the efficiency is also deteriorated.

Further, the controller CNT1 switches the first switch SW1 and the third switch SW3 from on to off at the fourth timing t4.

The inductor current IL flows through the first switch SW1 and the third switch SW3 while being distributed during a period from the third timing t3 to the fourth timing t4. During the period from the second timing t2 to the fourth timing t4, the inductor current IL increases.

2-2. Control of Second and Fourth Switches

2-2-1. Exemplary Embodiment

As illustrated in FIG. 2, in the exemplary embodiment, after the fourth timing t4 at which the first switch SW1 and the third switch SW3 are switched from on to off, the controller CNT1 first switches the fourth switch SW4 from off to on at a fifth timing t5. A period from the fourth timing t4 to the fifth timing t5 is what is generally called a dead time period.

When the fourth switch SW4 is turned on, a current flows from the ground potential to the inductor L1 through the fourth switch SW4. The second switch SW2 is turned off until a sixth timing t6 arrives, whereby no current flows from the first capacitor CFLY to the second capacitor CMID. Accordingly, during a period from the fifth timing t5 to the sixth timing t6, the current flowing through the fourth switch SW4 is equal to the inductor current IL.

The controller CNT1 switches the second switch SW2 from off to on at the sixth timing t6. This short-circuits the first end of the first capacitor CFLY and the first end of the second capacitor CMID. Immediately before the sixth timing t6, as illustrated in FIG. 1C, the fourth switch SW4 is turned on, and the first switch SW1, the second switch SW2, and the third switch SW3 are turned off. Further, during the period from the third timing t3 to the fourth timing t4, the first capacitor CFLY is charged, whereby the both-end potential difference VCFLY of the first capacitor CFLY increases. Further, the second capacitor CMID has been discharged, whereby the both-end potential difference VCMID of the second capacitor CMID decreases. As a result, immediately before the sixth timing t6, as illustrated in FIG. 1C, the both-end potential difference VCFLY of the first capacitor CFLY is higher than the half of the input voltage VIN (VIN/2), and the both-end potential difference VCMID of the second capacitor CMID is lower than the half of the input voltage VIN (VIN/2). In other words, immediately before the sixth timing t6, as illustrated in FIG. 1C, the voltage VSWH at the connection node of the first switch SW1 and the second switch SW2 is higher than the half of the input voltage VIN (VIN/2), and the voltage VMID at the connection node of the second switch SW2 and the third switch SW3 is lower than the half of the input voltage VIN (VIN/2). Accordingly, at the sixth timing t6, when the second switch SW2 is switched from off to on and the first end of the first capacitor CFLY and the first end of the second capacitor CMID are short-circuited, a current flows from the first end of the first capacitor CFLY toward the second capacitor CMID.

As a result, during a period from the sixth timing t6 to the first timing t1 in a next cycle, the current flowing through the fourth switch SW4 turns to be a sum of the inductor current IL and the current flowing from the first end of the first capacitor CFLY toward the second capacitor CMID.

During a period from the fifth timing t5 to the first timing t1 in the next cycle, the inductor current IL decreases. Accordingly, at the sixth timing t6, the inductor current IL is smaller than that at the fifth timing t5. This can suppress the spike current flowing through the fourth switch SW4 when the fourth switch SW4 is switched from off to on, and thus, the switching noise of the fourth switch SW4 can be reduced.

Figure 5:
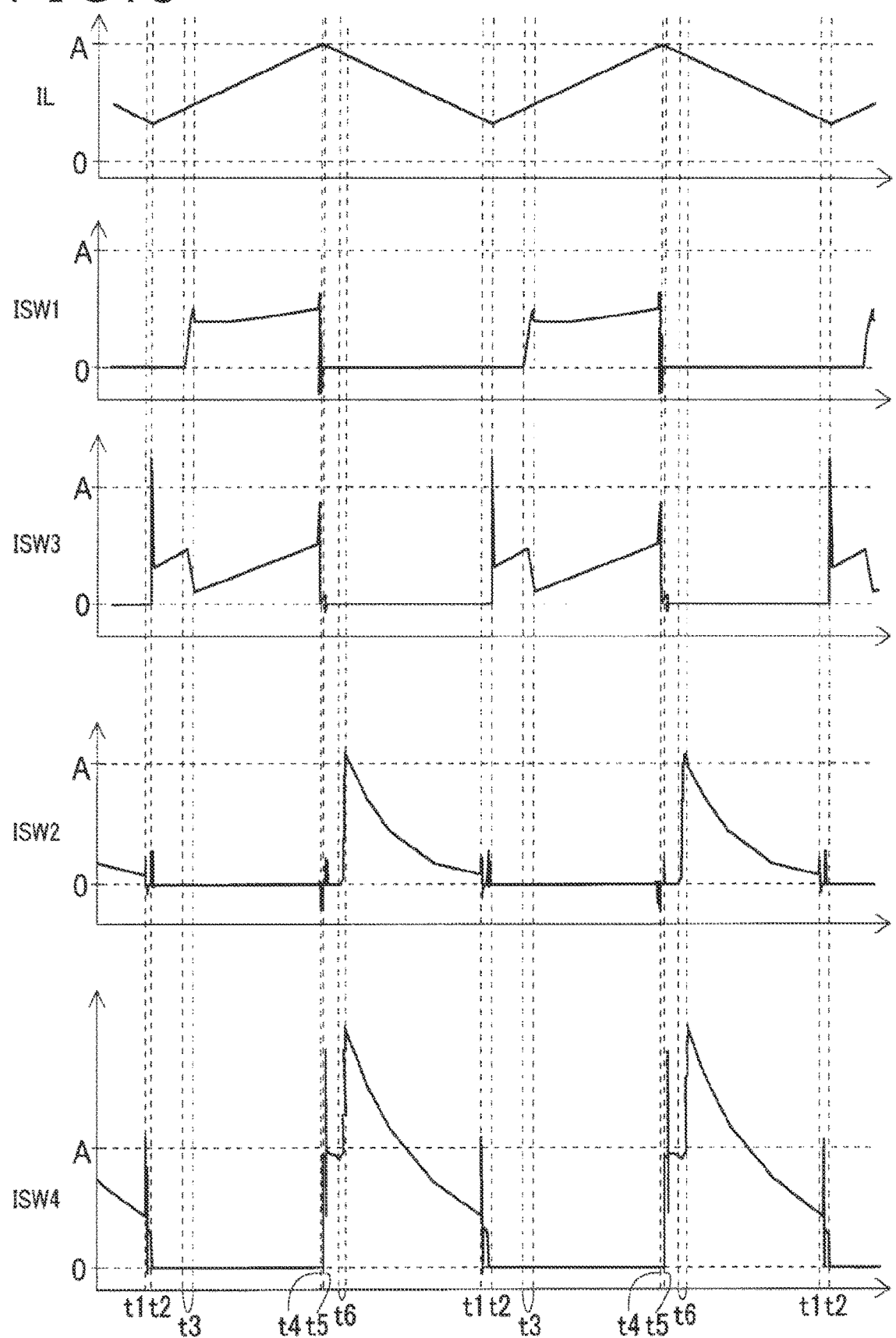
FIG. 5 is a timing chart illustrating respective currents flowing through an inductor and first to fourth switches.

The spike current flowing through the fourth switch SW4 does not affect the power supply line to which the input voltage VIN is applied. However, among respective spike currents flowing through the first to fourth switches SW1 to SW4, the spike current flowing through the fourth switch SW4 is the largest (refer to FIG. 5). Thus, even if the switching noise of the fourth switch SW4 does not propagate through the power supply line to which the input voltage VIN is applied, the switching noise of the fourth switch SW4 may affect the outside of the switching power supply device while acting as radiation noise. In other words, in the exemplary embodiment, by reducing the switching noise of the fourth switch SW4, generation of the noise that is likely to affect the outside of the switching power supply device can be suppressed. Note that, FIG. 5 illustrates the inductor current IL and the currents ISW1 to ISW4 respectively flowing through the first to fourth switches SW1 to SW4 in the present exemplary embodiment. In FIG. 5, A denotes the maximum value of the inductor current IL.

In the present exemplary embodiment, a slew rate of the second switch control signal S2 at the sixth timing t6 is set smaller than a slew rate of the fourth switch control signal S4 at the fifth timing t5. This can avoid the current flowing through the second switch SW2 at the sixth timing t6 from rapidly increasing, and thus, switching noise of the second switch SW2 can be suppressed.

2-2-2. Reference Example

As illustrated in FIG. 3, in the reference example, after the fourth timing t4 at which the first switch SW1 and the third switch SW3 are switched from on to off, the controller CNT1 switches the second switch SW2 and the fourth switch SW4 from off to on at the fifth timing t5.

When the second switch SW2 and the fourth switch SW4 are turned on, the current flowing through the fourth switch SW4 turns to be the sum of the inductor current IL and the current flowing from the first end of the first capacitor CFLY toward the second capacitor CM ID. This increases the current flowing through the fourth switch SW4 when the fourth switch SW4 is switched from off to on, thereby increasing the switching noise of the fourth switch SW4.

3. Application

Figure 6:
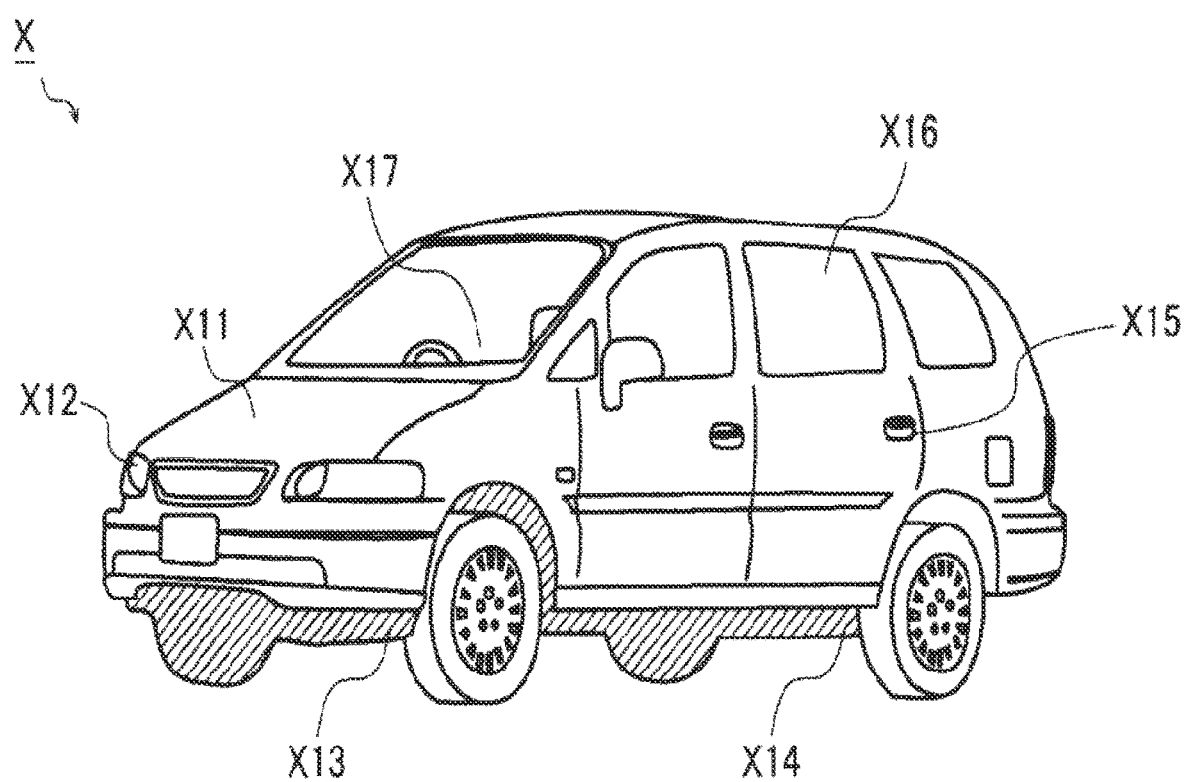
FIG. 6 is an external appearance view illustrating a configuration example of a vehicle.

Next, description will be made of an application example of the switching power supply device 1 described above. FIG. 6 is an external appearance view illustrating a configuration example of a vehicle mounting in-vehicle devices. A vehicle X in the present configuration example mounts in-vehicle devices X11 to X17 and a battery (not illustrated) that supplies power to the in-vehicle devices X11 to X17.

The in-vehicle device X11 is an engine control unit that performs control related to an engine (e.g., injection control, electronic throttle control, idling control, oxygen sensor heater control, and auto-cruise control).

The in-vehicle device X12 is a lamp control unit that performs lighting-on/off control of, for example, a high intensity discharged lamp (HID) or a daytime running lamp (DRL).

The in-vehicle device X13 is a transmission control unit that performs control related to a transmission.

The in-vehicle device X14 is a body control unit that performs control related to motion of the vehicle X (e.g., anti-lock brake system (ABS) control, electronic power steering (EPS) control, and electronic suspension control).

The in-vehicle device X15 is a security control unit that performs driving control of, for example, a door lock and a crime prevention alarm.

The in-vehicle device X16 is an electronic device embedded in the vehicle X at a factory shipping stage as a standard accessory or a factory-installed option accessory, such as a wiper, an electrically-controlled outside mirror, an automatic window, an electrically-controlled sliding roof, a power seat, and an air conditioner.

The in-vehicle device X17 is an electronic device optionally mounted on the vehicle X by a user, such as an in-vehicle audio/visual (A/V) device, a car navigation system, and an electronic toll collection system (ETC).

Note that the switching power supply device 1 described above can be embedded in any of the in-vehicle devices X11 to X17.

4. Notes

It should be noted that, in addition to the above-described exemplary embodiment, a configuration of the present disclosure can variously be modified without departing from the gist of the disclosure. It should be considered that the above-described exemplary embodiment is illustrative in all aspects and is not limitative. It should be understood that the technical range of the present disclosure is given, not by the description of the above-described exemplary embodiment, but by the scope of the claims, and all modifications belonging to meanings and ranges of the claims and equivalents are involved.

For example, in the above-described exemplary embodiment, in the first pair configured with the first switch SW1 and the third switch SW3, the controller CNT1 shifts the timing for switching from off to on between two switches (the first switch SW1 and the third switch SW3), while in the second pair configured with the second switch SW2 and the fourth switch SW4, the controller CNT1 shifts the timing for switching from off to on between two switches (the second switch SW2 and the fourth switch SW4). However, the present disclosure is not limited to such control.

In the first pair configured with the first switch SW1 and the third switch SW3, the controller CNT1 may shift the timing for switching from off to on between two switches (the first switch SW1 and the third switch SW3) while, in the second pair configured with the second switch SW2 and the fourth switch SW4, the controller CNT1 may not shift the timing for switching from off to on between two switches (the second switch SW2 and the fourth switch SW4). In contrast, in the first pair configured with the first switch SW1 and the third switch SW3, the controller CNT1 may not shift the timing for switching from off to on between two switches (the first switch SW1 and the third switch SW3) while, in the second pair configured with the second switch SW2 and the fourth switch SW4, the controller CNT1 may shift the timing for switching from off to on between two switches (the second switch SW2 and the fourth switch SW4).

Alternatively, unlike the above-described exemplary embodiment, the slew rate of the first switch control signal S1 at the third timing t3 may not be smaller than the slew rate of the third switch control signal S3 at the second timing t2.

Alternatively, unlike the above-described exemplary embodiment, the slew rate of the second switch control signal S2 at the sixth timing t6 may not be smaller than the slew rate of the fourth switch control signal S4 at the fifth timing t5.

Alternatively, how to set the third timing t3 is not particularly limited. For example, a setting value indicating a length of the period from the second timing t2 to the third timing t3 may be stored in an internal memory or an internal register in the controller CNT1 in advance, and the controller CNT1 may switch the first switch SW1 from off to on based on the setting value. Alternatively, for example, the controller CNT1 may detect a voltage obtained by subtracting the voltage VSW from a third switch drive signal G3, and may switch the first switch SW1 from off to on when the voltage obtained by subtracting the voltage VSW from the third switch drive signal G3 exceeds a predetermined value (a value equal to or more than a threshold voltage of the NMOS transistor used as the third switch SW3 but equal to or less than the half of the input voltage VIN).

Alternatively, how to set the sixth timing t6 is not particularly limited. For example, a setting value indicating a length of the period from the fifth timing t5 to the sixth timing t6 may be stored in the internal memory or the internal register in the controller CNT1 in advance, and the controller CNT1 may switch the second switch SW2 from off to on based on the setting value. Alternatively, for example, the controller CNT1 may detect a voltage obtained by subtracting a ground voltage from a fourth switch drive signal G4, and may switch the first switch SW1 from off to on when the voltage obtained by subtracting the ground voltage from the fourth switch drive signal G4 exceeds a predetermined value (a value equal to or more than a threshold voltage of the NMOS transistor used as the fourth switch SW4 but equal to or less than the half of the input voltage VIN).

Alternatively, unlike the above-described exemplary embodiment, the fourth switch SW4 may be a diode. In a case where the fourth switch SW4 is the diode, the controller CNT1 controls switching on/off of the first to third switches SW1 to SW3 to control a bias voltage applied to the fourth switch SW4 (diode). Switching on/off of the fourth switch SW4 (diode) is determined by the bias voltage applied to the fourth switch SW4 (diode). Thus, the controller CNT1 indirectly controls switching on/off of the fourth switch SW4 (diode).

The present disclosure can be used for a step-down type switching power supply device used in all fields (e.g., a home electric appliance field, an automotive field, and an industrial machinery field).

What is claimed is:

1. A switching power supply device that steps down an input voltage to an output voltage, the switching power supply device comprising:
   a first switch whose first end is allowed to be connected to an applying end of the input voltage;
   a first capacitor;
   a second switch whose first end is allowed to be connected to a second end of the first switch and a first end of the first capacitor;
   a second capacitor;
   a third switch whose first end is allowed to be connected to a second end of the second switch and a first end of the second capacitor;
   an inductor;
   a fourth switch whose first end is allowed to be connected to a second end of the third switch, a second end of the first capacitor, and a first end of the inductor; and
   a controller configured to:
   shift a timing of switching from off to on between the first switch and the third switch;

generate a first switch control signal to control switching on and off of the first switch;
generate a second switch control signal to control switching on and off of the second switch;
generate a third switch control signal to control switching on and off of the third switch; and
generate a fourth switch control signal to control switching on and off of the fourth switch, wherein
the first switch and the third switch are configured to be a first pair, and the second switch and the fourth switch are configured to be a second pair, and
a slew rate of the first switch control signal at a timing of switching the first switch from off to on is smaller than a slew rate of the third switch control signal at a timing of switching the third switch from off to on.

2. The switching power supply device according to claim 1, wherein
the controller is further configured to shift a timing of switching from off to on between the second switch and the fourth switch in the second pair, and
a slew rate of the second switch control signal at a timing of switching the second switch from off to on is smaller than a slew rate of the fourth switch control signal at a timing of switching the fourth switch from off to on.

3. The switching power supply device according to claim 1, wherein
the controller is further configured to shift a timing of switching from off to on between the second switch and the fourth switch,
in a case where the timing of switching from off to on is shifted between the first switch and the third switch in the first pair, the controller is further configured to switch the third switch from off to on, and then switch the first switch from off to on while the third switch is kept turned on, and
in a case where the timing of switching from off to on is shifted between the second switch and the fourth switch in the second pair, the controller is further configured to switch the fourth switch from off to on, and then switch the second switch from off to on while the fourth switch is kept turned on.

4. A switch control device, comprising:
a controller configured to:
generate a first switch control signal to control switching on and off of a first switch whose first end is allowed to be connected to an applying end of an input voltage;
generate a second switch control signal to control switching on and off of a second switch whose first end is allowed to be connected to a second end of the first switch and a first end of a first capacitor;
generate a third switch control signal to control switching on and off of a third switch whose first end is allowed to be connected to a second end of the second switch and a first end of a second capacitor; and
generate a fourth switch control signal to control switching on and off of a fourth switch whose first end is allowed to be connected to a second end of the third switch, a second end of the first capacitor, and a first end of an inductor, wherein
the first switch and the third switch are configured to be a first pair, and the second switch and the fourth switch are configured to be a second pair,
the controller is further configured to shift a timing of switching from off to on between the first switch and the third switch in the first pair, and
a slew rate of the first switch control signal at a timing of switching the first switch from off to on is smaller than a slew rate of the third switch control signal at a timing of switching the third switch from off to on.

5. An in-vehicle device, comprising:
a switching power supply device that steps down an input voltage to an output voltage, the switching power supply device including
a first switch whose first end is allowed to be connected to an applying end of the input voltage,
a first capacitor,
a second switch whose first end is allowed to be connected to a second end of the first switch and a first end of the first capacitor,
a second capacitor,
a third switch whose first end is allowed to be connected to a second end of the second switch and a first end of the second capacitor,
an inductor,
a fourth switch whose first end is allowed to be connected to a second end of the third switch, a second end of the first capacitor, and a first end of the inductor, and
a controller configured to:
shift a timing of switching from off to on between the first switch and the third switch;
generate a first switch control signal to control switching on and off of the first switch;
generate a second switch control signal to control switching on and off of the second switch;
generate a third switch control signal to control switching on and off of the third switch; and
generate a fourth switch control signal to control switching on and off of the fourth switch, wherein
the first switch and the third switch are configured to be a first pair, and the second switch and the fourth switch are configured to be a second pair, and
a slew rate of the first switch control signal at a timing of switching the first switch from off to on is smaller than a slew rate of the third switch control signal at a timing of switching the third switch from off to on.

6. An in-vehicle device, comprising:
a switch control device configured to:
generate a first switch control signal to control switching on and off of a first switch whose first end is allowed to be connected to an applying end of an input voltage;
generate a second switch control signal to control switching on and off of a second switch whose first end is allowed to be connected to a second end of the first switch and a first end of a first capacitor;
generate a third switch control signal to control switching on and off of a third switch whose first end is allowed to be connected to a second end of the second switch and a first end of a second capacitor; and
generate a fourth switch control signal to control switching on and off of a fourth switch whose first end is allowed to be connected to a second end of the third switch, a second end of the first capacitor, and a first end of an inductor, wherein the first switch and the third switch are configured to be a first pair, and the second switch and the fourth switch are configured to be a second pair, the controller is further configured to shift a timing of switching from off to on between the first switch and the third switch in the first pair, and a slew rate of the first switch control signal at a timing of switching the first switch from off to on is smaller than a slew rate of the third switch control signal at a timing of switching the third switch from off to on.

7. A vehicle, comprising:

an in-vehicle device that includes a switching power supply device that steps down an input voltage to an output voltage, the switching power supply device including a first switch whose first end is allowed to be connected to an applying end of the input voltage, a first capacitor, a second switch whose first end is allowed to be connected to a second end of the first switch and a first end of the first capacitor, a second capacitor, a third switch whose first end is allowed to be connected to a second end of the second switch and a first end of the second capacitor, an inductor, a fourth switch whose first end is allowed to be connected to a second end of the third switch, a second end of the first capacitor, and a first end of the inductor, and a controller configured to:

shift a timing of switching from off to on between the first switch and the third switch;

generate a first switch control signal to control switching on and off of the first switch;

generate a second switch control signal to control switching on and off of the second switch;

generate a third switch control signal to control switching on and off of the third switch; and generate a fourth switch control signal to control switching on and off of the fourth switch, wherein the first switch and the third switch are configured to be a first pair, and the second switch and the fourth switch are configured to be a second pair, and a slew rate of the first switch control signal at a timing of switching the first switch from off to on is smaller than a slew rate of the third switch control signal at a timing of switching the third switch from off to on; and a battery that supplies power to the in-vehicle device.

8. A vehicle, comprising:

an in-vehicle device that includes a switch control device configured to:

generate a first switch control signal to control switching on and off of a first switch whose first end is allowed to be connected to an applying end of an input voltage;

generate a second switch control signal to control switching on and off of a second switch whose first end is allowed to be connected to a second end of the first switch and a first end of a first capacitor;

generate a third switch control signal to control switching on and off of a third switch whose first end is allowed to be connected to a second end of the second switch and a first end of a second capacitor; and generate a fourth switch control signal to control switching on and off of a fourth switch whose first end is allowed to be connected to a second end of the third switch, a second end of the first capacitor, and a first end of an inductor, wherein the first switch and the third switch are configured to be a first pair, and the second switch and the fourth switch are configured to be a second pair, the controller is further configured to shift a timing of switching from off to on between the first switch and the third switch in the first pair, and a slew rate of the first switch control signal at a timing of switching the first switch from off to on is smaller than a slew rate of the third switch control signal at a timing of switching the third switch from off to on; and a battery that supplies power to the in-vehicle device.

* * * * *